United States Patent [19]

Vögele et al.

[11] Patent Number: 5,437,465
[45] Date of Patent: Aug. 1, 1995

[54] TOOL CHANGING DEVICE ON A HAND-OPERATED MACHINE TOOL

[75] Inventors: Roland Vögele; Dieter Hirt, both of Winnenden, Germany

[73] Assignee: Atlas Copco Elektrowerkzeuge GmbH, Winnenden, Germany

[21] Appl. No.: 141,793

[22] Filed: Oct. 22, 1993

[51] Int. Cl.⁶ ............................................. B23B 31/107
[52] U.S. Cl. ........................................ 279/22; 279/75; 279/82; 279/905
[58] Field of Search ............. 279/22, 24, 28–30, 279/75, 82, 905, 906, 143–145, 158; 408/239 R, 239 A, 238, 241 R; 403/325, DIG. 6; 173/13, 48, 104, 109

[56] References Cited

U.S. PATENT DOCUMENTS

| 2,736,561 | 2/1956 | Hansen | 279/75 |
| 5,199,833 | 4/1993 | Fehrle et al. | 279/905 |

FOREIGN PATENT DOCUMENTS

| 0448801 | 12/1990 | European Pat. Off. |
| 3408857 | 7/1985 | Germany | 403/DIG. 6 |
| 3443186 | 5/1986 | Germany |
| 3409494 | 3/1987 | Germany |
| 3405102 | 6/1987 | Germany |
| 0265380 | 4/1988 | Germany |
| 3636027 | 4/1988 | Germany |
| 298027 | 1/1989 | Germany |
| 3828309 | 2/1990 | Germany |

*Primary Examiner*—Steven C. Bishop
*Attorney, Agent, or Firm*—McGlew and Tuttle

[57] ABSTRACT

A spindle sleeve (4) is provided for the rotary operation in a tool changing device on a hand-operated machine tool, especially a drill hammer for optional operation with a hammer drill or with another tool. To make rapid tool change possible with a simple design, a locking body (7), which co-rotates with the spindle sleeve (4), is mounted in at least one perforation (6) of the spindle sleeve (4). An adapter (14), on which the corresponding tool can be fixed, can be axially inserted into the spindle sleeve (4) with a guide surface (22, 23), and has depressions (13) for the locking bodies (7) for nonrotatable and axially nondisplaceable connection to the spindle sleeve (4). An outer sleeve (8), which blocks the locking bodies (7) in the depressions (13) in a locking position and radially releases them in its release position, is displaceably arranged on the spindle sleeve (4).

10 Claims, 1 Drawing Sheet

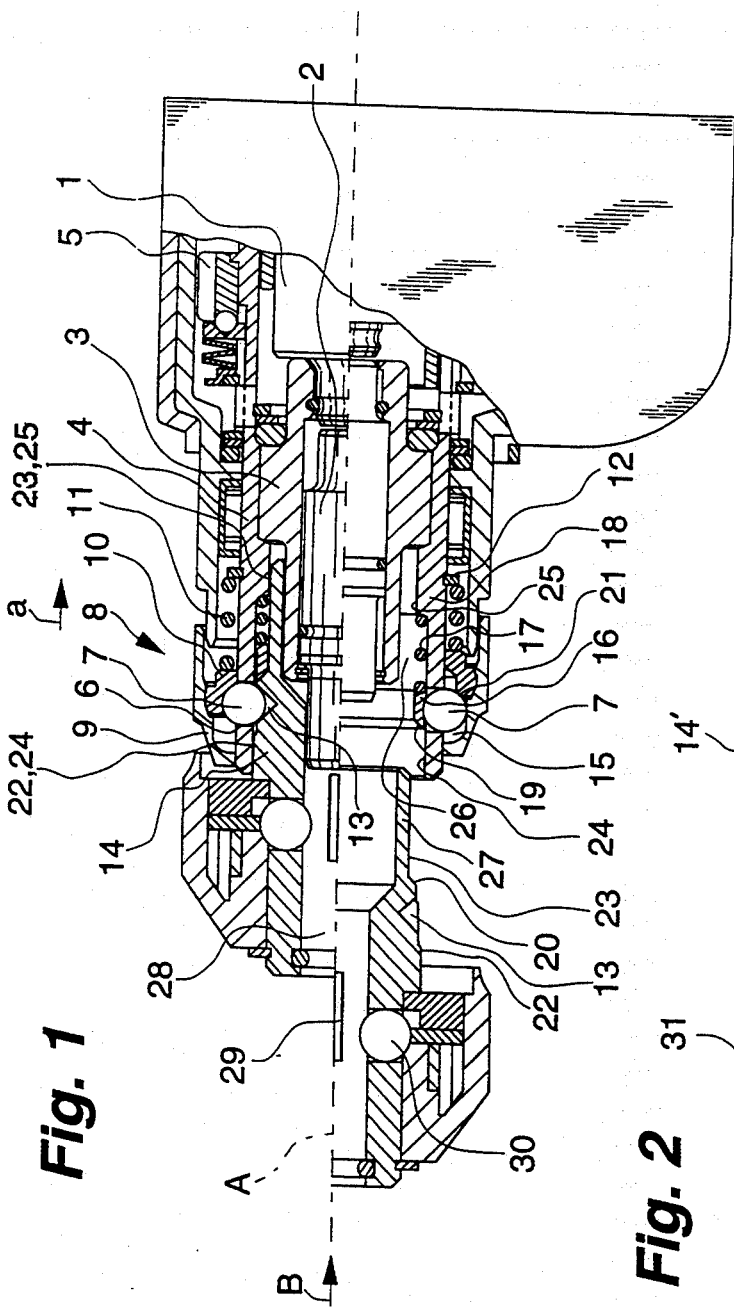
Fig. 1
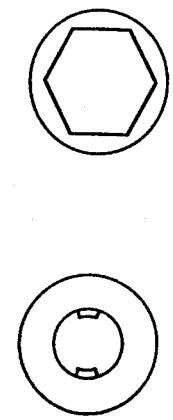
Fig. 4
Fig. 3
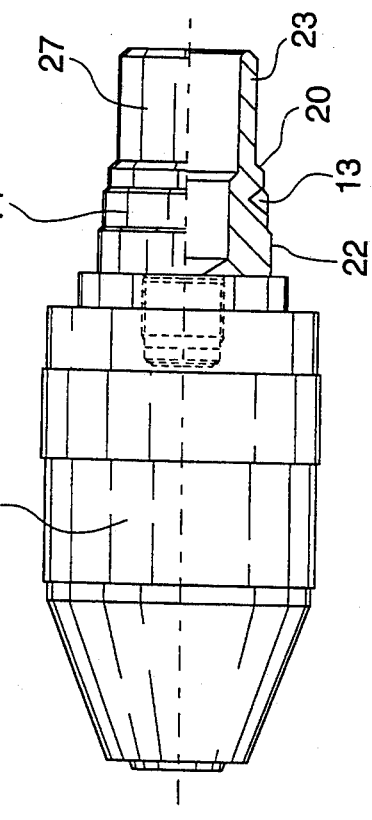
Fig. 2

TOOL CHANGING DEVICE ON A HAND-OPERATED MACHINE TOOL

FIELD OF THE INVENTION

The present invention pertains to a tool changing device on a hand-operated machine tool, especially for a drill hammer for optional operation with a hammer drill or with another tool, such as a drill or screw bit, wherein a spindle sleeve is provided for rotary driving, a riveting die is used for impact drive, arranged in the spindle sleeve if necessary, wherein a locking body corotating with the spindle sleeve is mounted in at least one perforation of the spindle sleeve, and an adaptor on which the tool can be fixed is axially inserted with a guide surface into the spindle sleeve, the adaptor having at least one depression for each locking body for nonrotatable and axially nondisplacable connection to the spindle sleeve.

BACKGROUND OF THE INVENTION

A drill hammer with detachable tool holding fixture possessing the above-described characteristics was described in EP 0 448 801 A1. The tool holding fixture is mounted on a spindle sleeve by means of balls, which are held in recesses of the tool holding fixture and in holes of the spindle sleeve by a rotatable, but axially nondisplaceable ring, which is provided with openings. The ring is located within a clamping collar. To remove the tool holding fixture, the ring can be held through the clamping collar. After a rotation, the balls must then be removed from the outside. For example, a bar magnet is necessary for this. This is complicated, and the balls may be lost.

A tool changing device for a drill hammer is described in DE 34 09 494 C2. Standard drills or hammer drills can be inserted into the tool holding fixture. The tool holding fixture as a whole is an assembly unit. It is expensive because of the various possibilities integrated in it. Its true running property seems to need to be improved.

The tool holding fixture according to DE 34 09 494 C2 cannot be removed from the drill hammer for changing the tools. If a hammer drill is to be replaced with a standard drill, the latter is to be fixed by means of a drill chuck key. This prolongs the time needed for the tool change.

A device similar to that described in DE 34 09 494 C2 is described in DE 34 05 102 C2.

A drill hammer, in the guide tube of which various tool holding fixtures can be inserted, is described in DE 38 28 309 A1. However, the two tool holding fixtures described are to be fixed on the guide tube with different means.

In one case, the tool holding fixture, designed as a jaw chuck, is held by means of locking balls, which are located in holes of the tool holding fixture and in perforations of the guide tube. The balls are blocked radially by a ring, which is axially displaceable. The ring is covered from the outside and poorly accessible. The removal of the tool holding fixture is not described. At any rate, it is not simple, and the balls may fall out after removal.

In the second case, the tool holding fixture with radial projections and with a hidden pin is connected to the guide tube. The pin must be pulled for removal. The pin may be lost after it has been pulled.

DE 34 43 186 A1 discloses a drill hammer, in which an externally exposed outer sleeve is mounted axially displaceably, as a result of which the overall length of the drill hammer is increased by the path of displacement of this outer sleeve.

A hand-operated machine tool, in which tool change is possible through a rotatable outer sleeve, is described in DE 36 36 027 A1.

SUMMARY AND OBJECTS OF THE INVENTION

It is an object of the present invention to provide a device of the type discussed above, in which rapid tool change is possible even in the case of hammer drills with different fixture shafts, and in which reliable true running of the tool is guaranteed.

According to the invention, a tool changing device is provided for a hand operated machine tool, such as a drill hammer for optional operation with a hammer drill or with another tool, such as a drill or a screw bit. The tool includes a spindle sleeve for rotary driving, a riveting die used for impact drive, preferably arranged on the spindle sleeve. A locking body is provided corotating with the spindle sleeve, mounted in at least one perforation of the spindle sleeve. An adaptor, on which the tool can be fixed, is axially inserted with a guide surface into the spindle sleeve. The adaptor has at least one depression for each locking body for nonrotatable and axially nondisplacable connection to the spindle sleeve. An outer sleeve is provided which is freely exposed on the outside and which blocks the locking body or locking bodies in the depression or depressions of the adaptor for maintaining the adaptor in a locked position. The outer sleeve releases the locking body or locking bodies in a released position. The outer sleeve is mounted axially displaceably on the spindle sleeve. A pocket is provided for accommodating the locking body or bodies in the release position, on the outer sleeve. An inner sleeve is provided, which can be brought from a first displacement position into a second displaced position by means of a stop edge of the adaptor, and which presses the locking body or locking bodies into the outer sleeve in the first displaced position, and blocks these in its released position as a result. The inner sleeve, is arranged axially displaceably in the spindle sleeve. The locking body can be caused to engage the depression of the adaptor by pushing in the adaptor.

The inner sleeve is preferably loaded by a spring which brings it from the second displaced position into the first displaced position. The spring is dimensioned such that it pushes the adaptor out of the spindle sleeve in the released position of the outer sleeve. The adaptor extends over a riveting die catch sleeve arranged in the spindle sleeve.

The locking bodies are preferably balls. The adaptor is rotatable in the spindle sleeve until the locking bodies snap into the depressions. An edge, by which the locking bodies are supported in the released position of the outer sleeve is provided in the outer sleeve. The depressions are preferably conical.

Rapid tool change is possible, because only the adapter with the tool must be removed for this purpose, and another adapter carrying the other tool must be inserted into the spindle sleeve. Both can be performed without auxiliary means, e.g., a key. For tool change, the outer sleeve is grasped on its outside with one hand and manually displaced. No other parts of the device need to be removed, so that they cannot be lost, either.

Reliable true running is guaranteed, because the adapter engages the spindle sleeve with a guide surface and is held nonrotatably on the spindle sleeve by means of the locking bodies.

The design of the device is relatively simple, because it is not necessary to integrate all peculiarities of the possible tools in the same assembly unit. It is possible, e.g., to keep ready an adapter with a quick-action chuck for standard drills and an adapter with an SDS fixture for hammer drills, and still another adapter with an SW 13 (wrench size) fixture. A special adapter can be provided for each type of fixture shaft. In all cases, the adapter actually used is held on the spindle sleeve with the same means, namely, the locking bodies.

It is also favorable that a dustproof design is possible without any problem.

After the adapter has been pulled out, the outer sleeve remains in the displaced position, so that it does not have to be moved manually when the adapter is being pushed in. When the adapter is being pushed in, it pushes back the inner sleeve, so that the locking bodies can reach the depressions of the inner sleeve. Rotatability is ensured to facilitate this.

The inner sleeve is preferably loaded by a spring, which brings it from the second displaced position into the first displaced position. The spring is preferably dimensioned to be such that it pushes the adapter out of the spindle sleeve in the release position of the outer sleeve.

The adapter extends over a riveting die catch sleeve arranged in the spindle sleeve in order to prevent the overall length of the machine tool from increasing considerably despite the relatively large guide surfaces on the adapter.

The present invention can be used not only in drill hammers, but in impact drills, drills and screwdrivers as well.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS In the drawings:

FIG. 1 is a partial view of a drill hammer and an adapter for mounting a hammer drill;

FIG. 2 is a partially cut away view of an adapter with a quick-action chuck for a drill;

FIG. 3 is a front view of an adapter for SDS-plus hammer drills; and

FIG. 4 is front view of an adapter for SW 13 hammer drills.

DETAILED DESCRIPTION OF THE PREFERRED EMBODIMENT

An impact body 1 is guided axially displaceably on an electropneumatic drill hammer. The impact body 1 is forced by a drive piston, not shown in detail, to perform reciprocating movement. The impact body 1 transmits its kinetic energy to a riveting die 2, which is mounted in a riveting die catch sleeve 3. A spindle sleeve 4, in which the impact body 1, the riveting die 2, and the riveting die catch sleeve 3 are concentrically arranged, can be driven by rotary movement via a gear ring 5.

In the area of the outer end of the spindle sleeve 4, three or more perforations 6 are provided, evenly distributed, on the circumference of the spindle sleeve 4. One perforation could also be sufficient in the extreme case. A ball 7, acting as a locking body, is located in each perforation 6. The balls 7 are located within an outer sleeve 8, which consists of a cover cap 9 and a ring 10 inserted into same. The ring 10 is loaded with a compression spring 11, which is supported on a stop 12 on the spindle sleeve 4.

FIG. 1 shows the outer sleeve 8 in its locked position above the axis A. In this position, the ring 10 holds the balls 7 in a conical depression 13 of an adapter 14. On its circumference, the adapter 14 has at least one conical depression 13, which is adapted to the ball 7, for each of the balls 7.

FIG. 1 shows the outer sleeve 8 in its manually retracted position below the axis A. The balls 7 are located in a pocket 15 of the cover cap 9.

An inner sleeve 16 is mounted in the spindle sleeve 4. The inner sleeve 16 is loaded by means of a compression spring 17, which is supported on an inner shoulder 18 of the spindle sleeve 4. The inner sleeve 16 has a front edge 19, which is associated with a stop edge 20 of the adapter 14.

FIG. 1 shows the first displaced position of the inner sleeve 16 below the axis A. In this position, the inner sleeve 16 pushes the balls 7 into the pockets 15. An edge 21 of the ring 10, which is in contact with the balls 7, now prevents the outer sleeve 8 from moving from its release position into the locking position.

FIG. 1 shows the inner sleeve 16 in its second displaced position above the axis A. It is held in this position by the stop edge 20 of the adapter 14.

The adapter 14 has cylindrical guide surfaces 22, 23 adjacent to the depressions 13 and to the stop edge 20. When the adapter has been pushed in, the guide surfaces 22, 23 are in close contact with the inner guide surfaces 24, 25 of the spindle sleeve 4. To improve guiding, the guide surfaces may be polished. In the area of the guide surface 25, the riveting die catch sleeve 3 has a recess 26 on the outside. The cylindrical end area 27 of the adapter 14, which the end area 27 has the guide surface 23, engages the recess 26. It is achieved as a result that despite large guide surfaces 22, 23 of the adapter 14, the overall length of the machine does not have to be correspondingly increased (cf. FIG. 1, top).

The adapter 14 according to FIG. 1 is provided with a usual SDS-plus fixture 28 for hammer drills. The fixture 28 has dogs 29 and snap-in balls 30.

The adapter 14' according to FIG. 2 has the same design as the adapter according to FIG. 1 in terms of the recesses 13, the stop edge 20, and the guide surfaces 22, 23. However, it carries a quick-action chuck 31 for rotary drills in this example. Further adapters or hammer drills, e.g., with SW 13 shafts (cf. FIG. 4), have designs similar to that of the SDS-plus adapter.

The mode of operation of the device described is approximately as follows:

In the position shown in the top part of FIG. 1, the balls 7 engage the depressions 13 of the adapter 14 and are held in the depressions 13 by means of the ring 10. As a result, the adapter 14 is nonrotatably and axially nondisplaceably connected to the spindle sleeve 4. The guide surfaces 22, 24; 23, 25 guarantee uniform true running of the adapter 14. A hammer drill inserted into the fixture 28 is rotated during operation and is impacted by the riveting die 2.

When the adapter 14 carrying the hammer drill is to be replaced, the outer sleeve 8 is displaced manually by its the cover cap 9 in the rearward direction in the direction of the arrow α against the force of the compression spring 11. As a result, the pocket 15 comes to lie above the balls 7, so that they are no longer locked in the recesses 13. Under the action of the compression spring 17, the inner sleeve 16 now displaces the adapter 14 by its stop 20 to the outside, opposite the direction of arrow α, and the conical depressions 13 push the balls 7 radially to the outside into the pocket 15. The inner sleeve 16 reaches a position in front of the perforations 6 and secures the balls 7 in the pocket 15. The adapter 14 can now be removed without problem (cf. FIG. 1, bottom).

The outer sleeve 8 remains in its release position, because the balls 7 are blocked at the edge 21.

The adapter 14' carrying a rotary drill in its the quick-action chuck 31 can subsequently be pushed into the machine. Its stop edge 20 now strikes the front edge 19 of the inner sleeve 16. The inner sleeve 16 is then pushed back during pushing in the direction of arrow α against the force of the compression spring 17, so that it leaves the perforations 6. The outer sleeve 8 or the adapter 14' is subsequently rotated around the axis A such that the balls 7 will be located opposite the depressions 13. Under the action of the compression spring 11, they then snap into the depressions 13, and the outer sleeve 8 moves into its locking position opposite the direction of arrow α. This is recognizable for the operator, so that it is certain that the adapter is correctly seated in the machine.

While a specific embodiment of the invention has been shown and described in detail to illustrate the application of the principles of the invention, it will be understood that the invention may be embodied otherwise without departing from such principles.

What is claimed is:

1. A tool changing device for hand-operated machine tools such as a drill hammer for optional operation with a hammer drill or another tool such as a drill or screw bit, comprising:
   a spindle sleeve connected to the machine tool, said spindle sleeve being provided for rotary driving;
   a riveting die used for impact drive, said riveting die being arranged with respect to the spindle sleeve;
   a locking body corotating with the spindle sleeve, said locking body being mounted in at least one perforation of said spindle sleeve;
   an adaptor, on which the tool can be fixed, said adaptor being axially inserted with a guide surface into said spindle sleeve, said adapter having a stop edge adjacent to said guide surface and said adaptor having at least one depression for each locking body for nonrotatable and axially nondisplaceable connection to said spindle sleeve;
   an outer sleeve mounted axially displaceably on said spindle sleeve, said outer sleeve being freely exposed on an outside of said tool changing device, said outer sleeve blocking movement of said locking body from an associated depression of said adaptor in a locking position and releasing said locking body in a released position of said outer sleeve;
   a pocket provided in said outer sleeve, said pocket for accommodating said locking body in said release position;
   an inner sleeve being moveable from a displaced position into a release position during insertion of said stop edge of said adaptor, said inner sleeve pressing said locking body into said outer sleeve in said displaced position and blocking said locking body in said release position, said inner sleeve being arranged axially displaceably in said spindle sleeve, wherein said locking body is caused to engage said depression of said adaptor by pushing in said adaptor.

2. A device according to claim 1, further comprising:
a spring loading said inner sleeve to urge said inner sleeve from said second displaced position into said first displaced position.

3. A device according to claim 2, wherein:
said spring is dimensioned to push said adaptor out of said spindle sleeve in said release position of said outer sleeve.

4. A device according to claim 1, further comprising:
a riveting die catch sleeve arranged in said spindle sleeve, said adaptor extending over said riveting die catch sleeve.

5. A device according to claim 1, wherein:
said locking bodies are balls.

6. A device according to claim 1, wherein:
said adaptor is rotatable in said spindle sleeve until said locking bodies snap into said depressions.

7. A device according to claim 1, further comprising:
a spring acting on said outer sleeve.

8. A device according to claim 1, wherein:
an edge is provided on said outer sleeve for supporting said locking bodies in a released position of said outer sleeve.

9. A device according to claim 1, wherein:
said depressions are conical.

10. A tool changing device for hand-operated machine tools such as a drill hammer for optional operation with a hammer drill or another tool such as a drill or screw bit, comprising:
   a spindle sleeve connected to the machine tool, said spindle sleeve being provided for rotary driving;
   a riveting die used for impact drive, said riveting die being arranged with respect to the spindle sleeve;
   a locking body corotating with the spindle sleeve, said locking body being mounted in at least one perforation of said spindle sleeve to form part of the machine tool;
   an adaptor, provided as an element separate from the machine tool, said adapter including means for fixing a tool to the adapter, said adaptor being axially inserted with a guide surface into said spindle sleeve, said adapter having a stop edge adjacent to said guide surface and said adaptor having at least one depression for each locking body for nonrotatable and axially nondisplaceable connection to said spindle sleeve;
   an outer sleeve mounted axially displaceably on said spindle sleeve, said outer sleeve being freely exposed on an outside of said tool changing device, said outer sleeve blocking movement of said locking body from an associated depression of said adaptor in a locking position and releasing said locking body in a released position of said outer sleeve;

a pocket provided in said outer sleeve, said pocket for accommodating said locking body in said release position;

an inner sleeve being moveable from a displaced position into a release position during insertion of said stop edge of said adaptor, said inner sleeve pressing said locking body into said outer sleeve in said displaced position and blocking said locking body in said release position, said inner sleeve being arranged axially displaceably in said spindle sleeve, wherein said locking body is caused to engage said depression of said adaptor by pushing in said adaptor.

* * * * *